United States Patent [19]
Debroche

[11] Patent Number: 5,362,343
[45] Date of Patent: Nov. 8, 1994

[54] PROCESS FOR THE MANUFACTURE OF A TIRE INCLUDING APPLYING INDIVIDUAL CORD LENGTHS AND APPARATUS FOR CARRYING OUT THE PROCESS

[75] Inventor: Claude Debroche, Cebazat, France

[73] Assignee: Sedepro, Paris, France

[21] Appl. No.: 192,197

[22] Filed: Feb. 4, 1994

Related U.S. Application Data

[63] Continuation of Ser. No. 896,826, Jun. 11, 1992, abandoned.

[30] Foreign Application Priority Data

Jun. 17, 1991 [FR] France ................. 91 07504

[51] Int. Cl.$^5$ ............................ B29D 30/10
[52] U.S. Cl. .................... 156/117; 156/123; 156/397; 156/406.4
[58] Field of Search ............. 156/397, 117, 123, 408, 156/409, 410, 421.4, 405.1, 406.4, 475, 492, 481, 486

[56] References Cited

U.S. PATENT DOCUMENTS

| | | | |
|---|---|---|---|
| 852,855 | 5/1907 | Sloper | 156/397 |
| 1,476,325 | 4/1923 | Converse | |
| 2,967,564 | 1/1961 | Niclas et al. | 156/421.4 |
| 3,424,634 | 1/1969 | Menell | 156/414 |
| 3,894,906 | 7/1975 | Pearce et al. | 156/123 X |
| 4,795,523 | 1/1989 | Laurent et al. | 156/397 |
| 4,952,259 | 1/1987 | Debroche et al. | |
| 5,039,372 | 8/1991 | Deal | 156/397 |

Primary Examiner—Geoffrey L. Knable
Attorney, Agent, or Firm—Brumbaugh, Graves, Donohue & Raymond

[57] ABSTRACT

The tire reinforcements are made from a single cord, a section (40) of which is advanced over a rigid core (2) until at least its central portion is opposite its final position on the support, whereupon folders (5) apply the section (40) radially against the core (2) by means of tappets (50) which act on the length (40) in the manner of a finger. The repetition of the same cycle as many times as there are lengths of cord in the reinforcement makes it possible to produce the complete reinforcement.

20 Claims, 8 Drawing Sheets

FIG. 9

PROCESS FOR THE MANUFACTURE OF A TIRE INCLUDING APPLYING INDIVIDUAL CORD LENGTHS AND APPARATUS FOR CARRYING OUT THE PROCESS This application is a continuation of application Ser. No. 07/896,826, filed on Jun. 11, 1992, now abandoned.

BACKGROUND OF THE INVENTION

The present invention concerns the manufacture of tires. More particularly, it relates to the putting in place of the reinforcement cords of the tire, both to form the carcass thereof and to form the crown reinforcement, also known as the belt. As used herein, "manufacture of a tire" means complete manufacture, or else a partial manufacture comprising at least the reinforcements produced in accordance with the process to be explained, the manufactured tire, for instance, not necessarily progressing to the stage of forming a tread.

In this technical field, processes and machines are already known for making it possible to integrate the manufacture of the tire reinforcements in the assembling of the tire itself. This means that, rather than having recourse to semi-finished products, a reinforcement or reinforcements are produced in situ at the time that the tire is manufactured, and are produced from a single cord. There is already known, for instance, the solution described in U.S. Pat. No. 4,795,523 which requires the production of a large number of retaining hooks for the cord. There is also known the solution described in U.S. Pat. No. 4,952,259, which does not make it possible to produce carcass reinforcements in which the cord extends from one bead of the tire to the other. There is further known the solution described in U.S. Pat. No. 3,894,906 which could not be used either for the manufacture of carcass reinforcements and in which the means for applying the cord onto the support are incapable of operating at a sufficiently fast rate to assure satisfactory productivity.

The object of the present invention is to provide a process and apparatus for the manufacture of a reinforcement which are capable of producing both radial carcass plies and crown reinforcements constituting the triangulated belt in which the cords are arranged at an angle which may be as small as about 15° and which does not employ hooks as provisional holding means. The term "cord" is used herein in a very broad sense, including a single cord or a cable or equivalent assembly, and this whatever the material constituting the cord.

In accordance with the invention, the process for the manufacture of a tire built progressively on a support by stacking the various components in the order and at the place required by the architecture of the tire in which the reinforcements of suitable material, for instance a natural or synthetic textile thread, a metal wire, a glass or other fiber or a mixed thread, are formed by advancing a given length of cord constituting a cord length over the support until at least the central part of said cord length is opposite its final position on the support is characterized by the fact that the said length is applied radially against the support by the action of two folders arranged on opposite sides of the support.

The specification describes and the drawings illustrate three embodiments of apparatus for the manufacture of a tire reinforcement employing this process, the first two being for the production of carcass reinforcements of rayon and the third for the production of crown reinforcements of steel. This will make it possible clearly to understand all aspects of the invention.

In accordance with the invention, the three embodiments of the apparatus have features in common comprising a displaceable rigid core, defining the shape of the inner surface of the tire, on which the tire is progressively built by stacking the various components in the order and at the place required by the final architecture of said tire, an assembly which permits the feeding of cord and the removal of a length of given size, which permits the insertion of said length in a device for the presenting of this length at the top of the core, the said presenting device placing at least the central or intermediate part of said length in a plane forming the desired angle with respect to the core just opposite its final place on the core, and of having two folders arranged on opposite sides of the core, each imparted a cyclic movement which approaches the core from the top thereof and descends in the direction towards the axis of rotation of the core, coming into contact with the length of cord and then moving towards the core during the course of the downward trajectory and applying the length of cord against the core at the desired place and then repeating the cycle with another cord.

DESCRIPTION OF THE DRAWINGS

The following figures will make it possible better to understand the operation of the apparatus developed in accordance with the principles of the invention.

DESCRIPTION OF PREFERRED EMBODIMENTS

It can be noted, first of all, that the assembly which permits the feeding of cord and the removal of a length 40 operates in accordance with the same principle and is identified by reference numerals starting with the number 8 in all embodiments. When it is used with textile cord, it is used with a pneumatic propulsion which is described in detail further below, identified in FIGS. 2, 4, 5 and 6 by reference numerals commencing with the number 9.

When it is used with metal wire, it is not necessary to employ pneumatic propulsion. On the other hand, it is advisable for the metal wire to have undergone a prior treatment enabling it to adhere well to the raw rubber. An example of such a treatment is found in U.S. Pat. No. 4,592,259.

Figure 7:
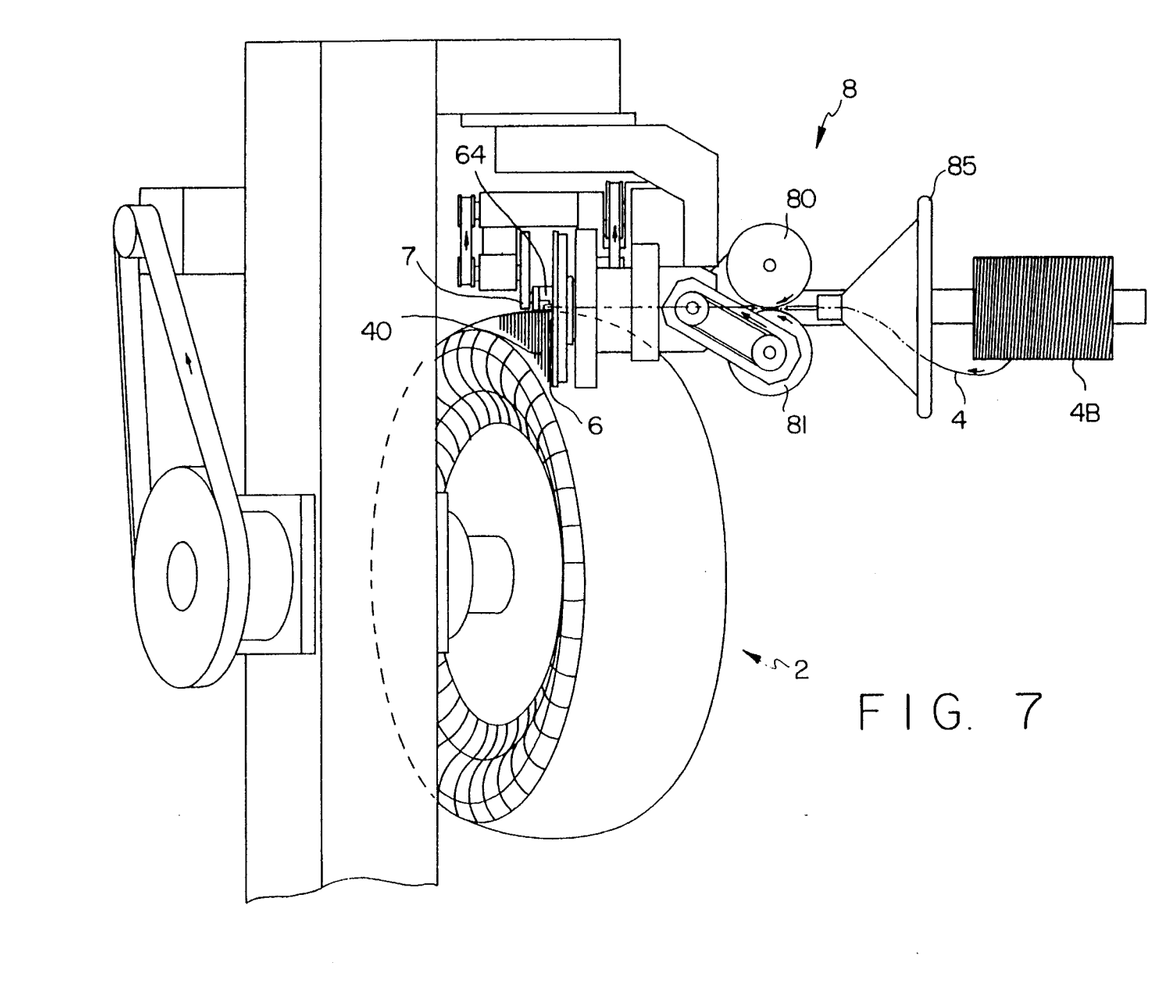
FIG. 7 is a side view of a third embodiment for the manufacture of a crown reinforcement.
Figure 8:
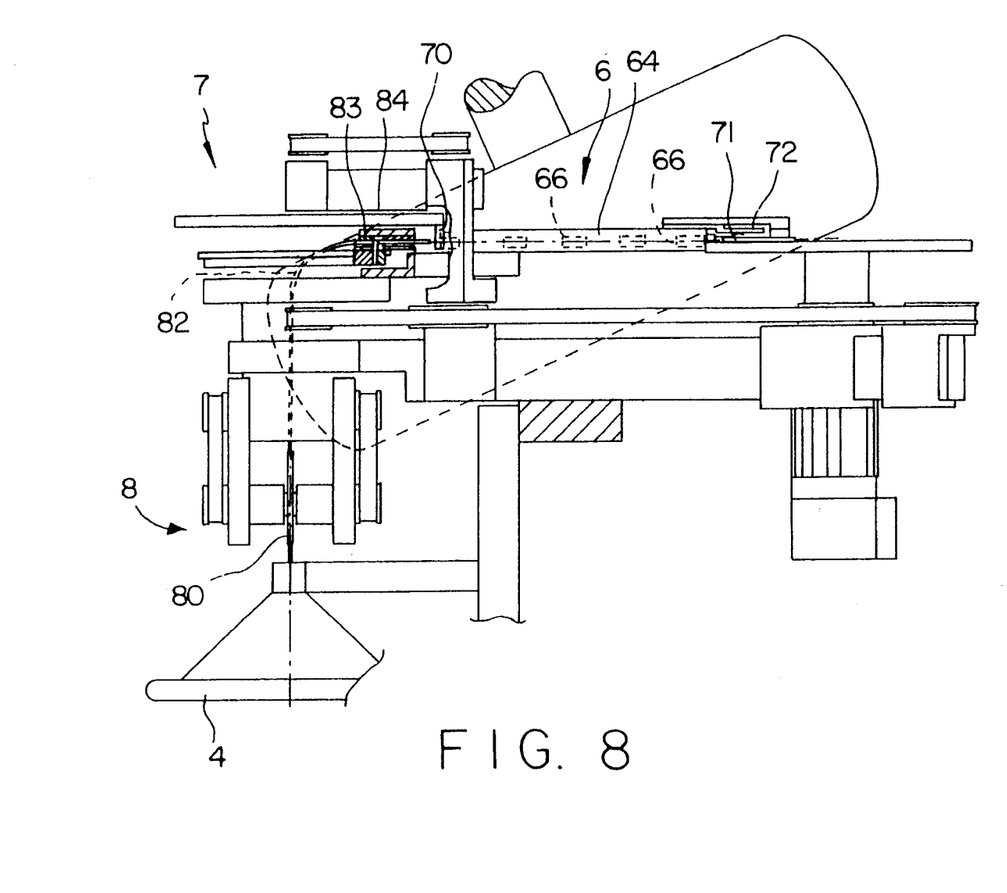
FIG. 8 is a top view of said apparatus.
Figure 9:
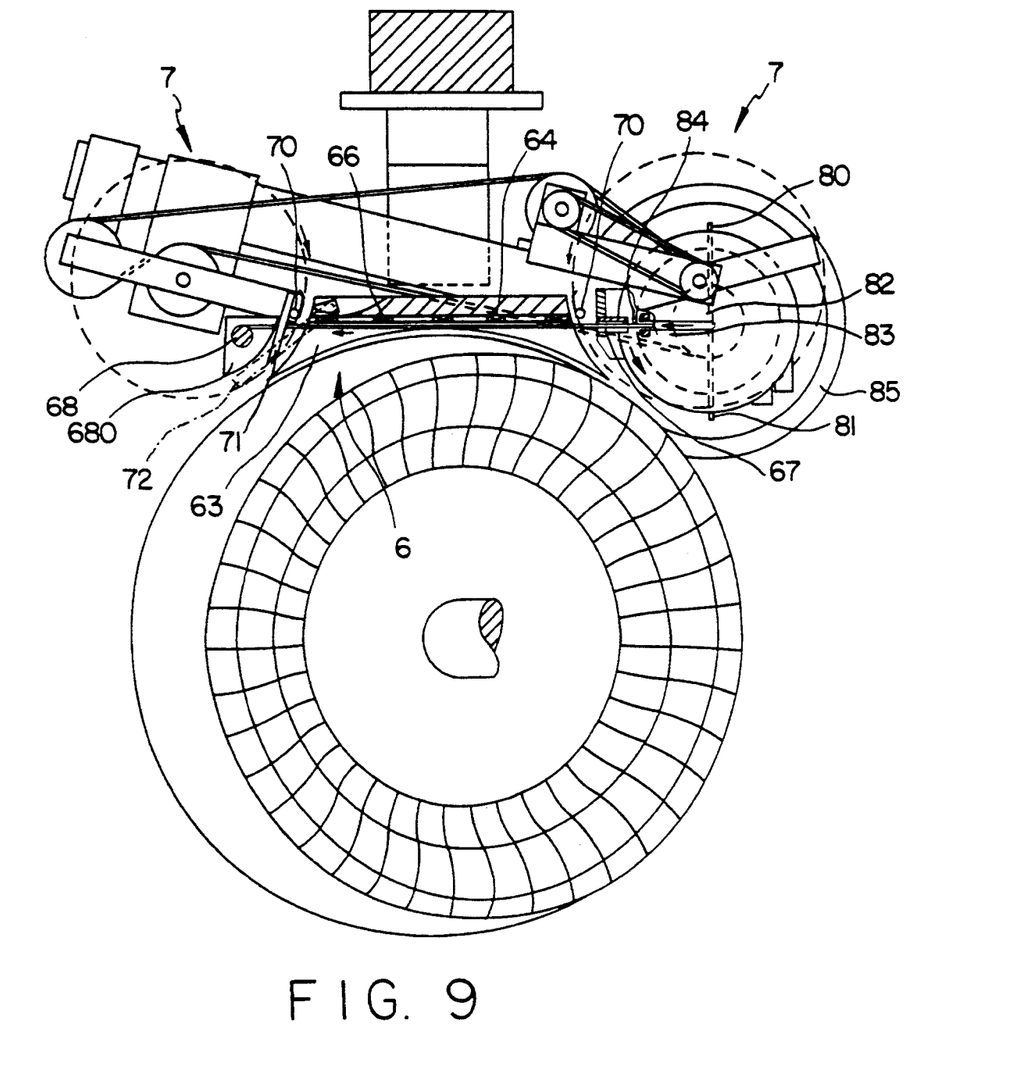
FIG. 9 is a side elevation of said apparatus.

Two types of folders are described below. In FIGS. 1 to 6, there can be noted a folder formed of a tappet 50 mounted on a belt 54 engaged on two pulleys 52, 53, which make it possible to bring the core more particularly into the region of the beads of the future tire. FIGS. 7, 8 and 9 show a rotary folder which makes it possible to move the core more particularly into the region of the shoulder of the future tire. The circular movement which it describes is tangent to the shoulder zone.

Figures 1, 1A, 1B, 1C:
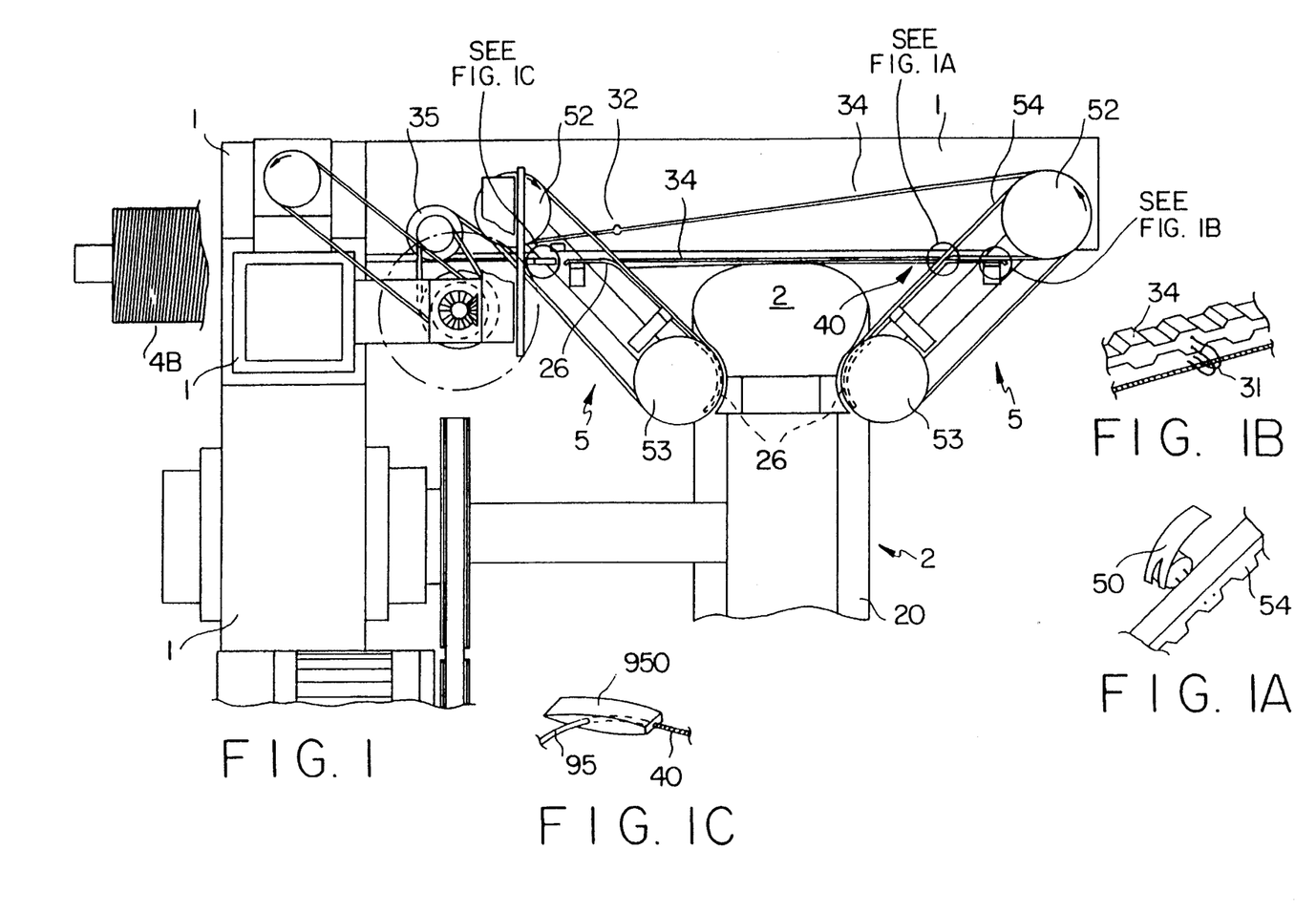
FIG. 1 is a view in elevation of the apparatus for the manufacture of a carcass reinforcement in which the core appears in radial section.
FIGS. 1A, 1B and 1C are enlargements of parts indicated in FIG. 1.
Figure 2:
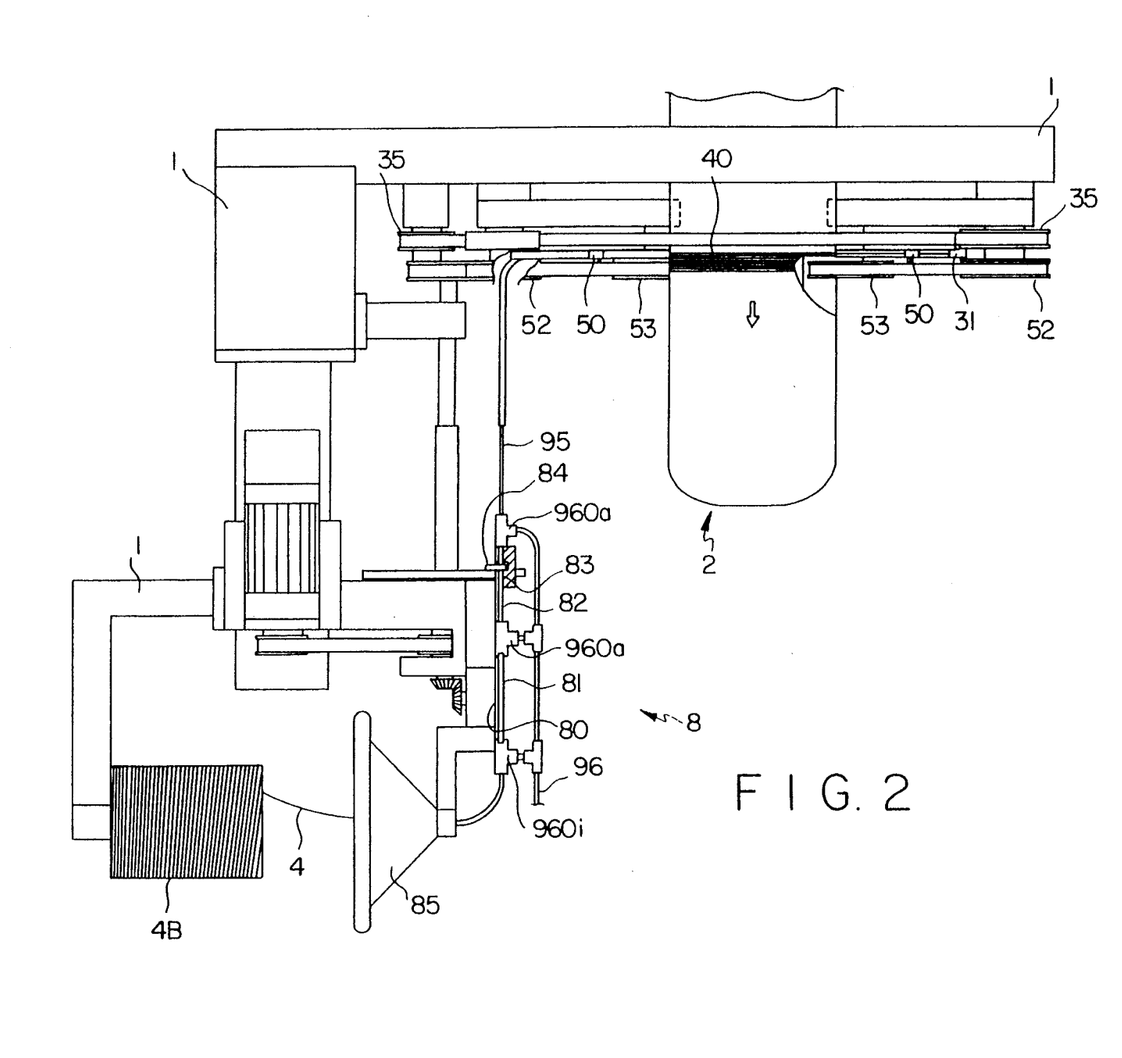
FIG. 2 is a top view of the apparatus of FIG. 1.
Figures 3, 4:
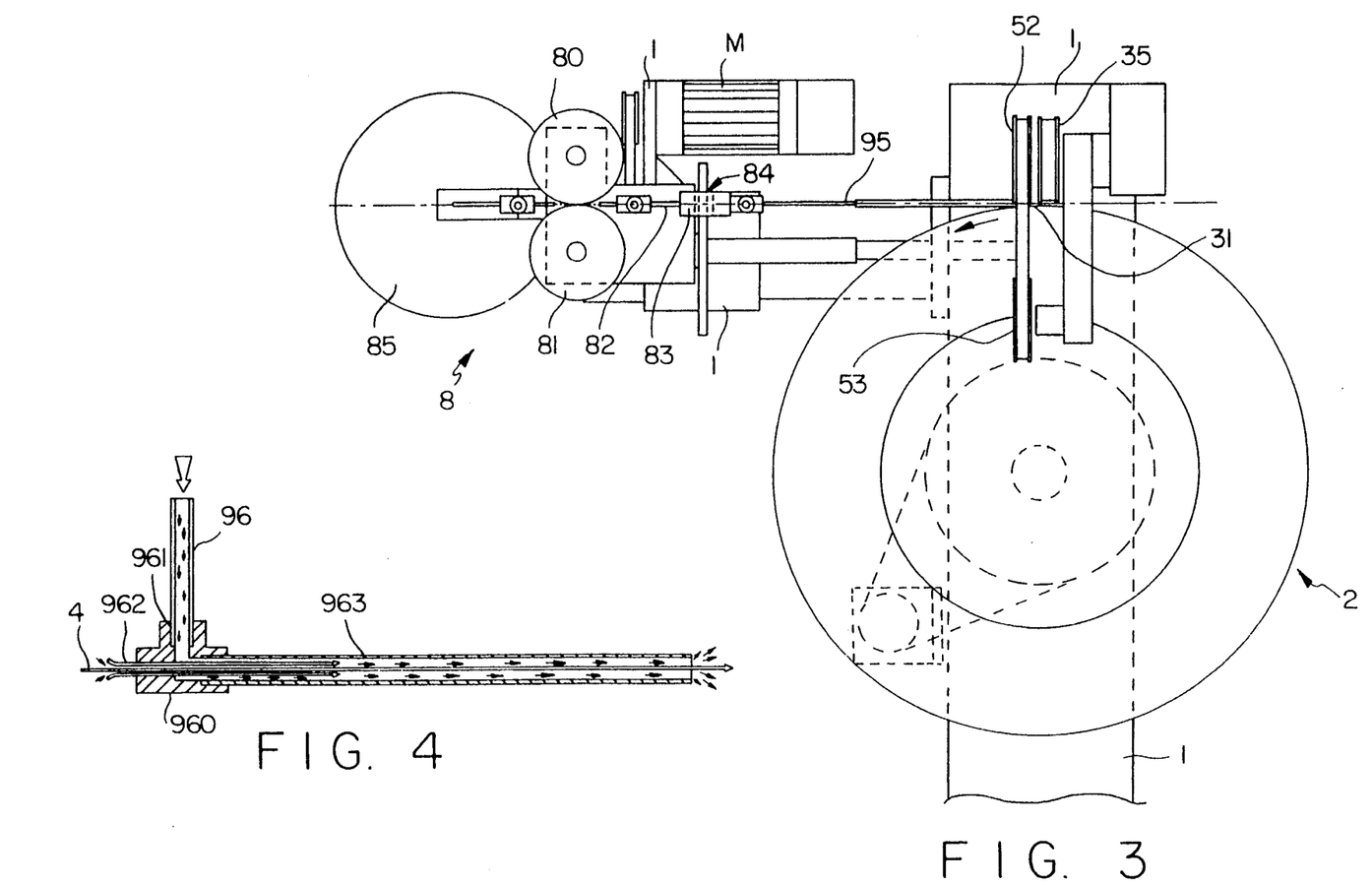
FIG. 3 is a side view of this apparatus.
FIG. 4 shows a detail of construction of a part of said apparatus.

The frame of the machine illustrated in FIGS. 1 to 3 appears in part and is designated by the reference numeral 1. The core 2 is covered with a layer of rubber on which the reinforcement cord 4 is to be deposited in order to form a radial carcass. The machine is fed with cord 4 from a reel 4B.

In order to assure the unwinding, the cord 4 is clamped between two rollers 80, 81 which are covered by an anti-skid covering. The roller 81 is driven. One can therefore constantly know the precise measure of the amount of cord fed from a knowledge of the number of turns of the drive and the step-down ratio installed. Any type of cord can be supplied and measured in this way.

All of the movements of the machine, except for the rotation of the core 2, are controlled synchronously by the motor M, of known angular speed, while the rotation of the core 2 is driven by another motor, not shown, the speed of which is related to that of the motor M. The core 2 is driven in rotation by another motor at a speed proportional to that of the motor M and dependent, furthermore, on the laying pitch of the lengths 40 of cord 4.

The natural or synthetic textile cords must necessarily be maintained taut by pneumatic propulsion. The principle of this pneumatic propulsion is illustrated in FIG. 4. The pneumatic propulsion is obtained within a tee 960 having a central branch 961 and two aligned branches 962 and 963. The central branch 961 receives a compressed air feed channel 96. It is seen that the compressed air is passed through the branch 963. The cord 4 is introduced through the branch 962 and, as soon as it leaves the branch 962, the compressed air tends to expel the cord 4 continuously out of said branch 963.

In FIG. 2 the channel 96 can be seen which conducts the compressed air to three places on the path of the cord 4. First of all, upstream of the unwinding rollers 80, 81, a reverse pneumatic propulsion 960i tends continuously to withdraw the cord 4 rearward so that, in case of stoppage or reverse operation of the machine during, for instance, adjustment phases upon starting, the cord 4 always remains taut and does not accumulate between the receiving flared tube 85 for the cord 4 and the unwinding rollers 80, 81. Downstream of the latter, there is a first propulsion 960a in forward direction, located at the start of the tube 82 conducting the cord 4 towards the barrel 83. Finally, a second propulsion in forward direction 960a is located at the start of the connection piece 95 which conducts the cord towards the device for presentation to the core. Coming back upstream, the cord has been introduced into a connection piece 82 the reinforced end of which constitutes a barrel 83 supporting the cord 4 while it is cut by the rotary knife 84. The lengths 40 of cord 4 to be placed on the core in order to constitute the carcass reinforcement are thus individualized.

Each length 40 of cord 4 which has thus been isolated is then subjected to the action of the presentation unit for the lengths 40 of cord, which unit comprises two clamps 31, 32 movable with respect to the core 2 and mounted on a clamp-holder belt 34, in its turn engaged on two pulleys 35. Each clamp 31, 32 grips a length 40 downstream of the device 8 for the feeding of cord and removal of lengths and drives it linearly above the core 2 and beyond the latter.

The folders are designated in general by the reference numeral 5. A folder comprises a tappet 50 fastened on a folder belt 54 engaged on two pulleys 52 and 53. The tappet 50 is shaped, and fastened on the folder belt 54, in such a manner that it is perpendicular to the direction of movement of the belt. It acts in the manner of a finger around which the cord 4 is partially wound, as will be better seen below.

The clamp-holder belt 34 with its clamps 31, 32 and the folders 5 are all firmly attached to each other and possibly movable with respect to the core 2 so as to adjust the angle at which it is desired to lay the reinforcement cords. In the embodiment of the invention illustrating this description, the machine is designed to deposit only cords at 90°, forming the radial carcass ply.

The presenting of a length of cord is effected by the action of a clamp 31 or 32. The two clamps 31, 32 act in succession, only one of them serving for the presenting of a length of cord 4 at a given moment. Each clamp 31 or 32 is naturally closed. In order to grasp the cord 4, its two jaws are moved apart, passing on opposite sides of the end 950 of the connection piece 95 (see FIG. 1C). As soon as a clamp leaves this end 950 (towards the right in FIG. 1C), it closes on the length 40 of the cord which appears at the outlet of the end 950.

The clamps 31, 32 are spaced apart on the belt 34 by a distance slightly greater than the length of the longest of the lengths 40 which it is desired to place, and therefore the length of a carcass cord in the tire. Thereupon, as soon as a clamp has released the cord under the action of the folders, which action is explained below, the following clamp, which has already grasped the cord, is ready to drive it again with respect to the core. The length of the belt 34 is selected accordingly.

By a suitable step-down gear, the clamp 31 or 32 drives the cord 4 at a speed about 10% greater than that imposed by the rollers 80, 81. When the cord 4 appears at the end 950 of the connection piece 95, the knife 84 has not yet released the future individual length 40 of cord. No sliding of the cord 4 is possible with respect to the rollers 80, 81. At this precise moment, the cord 4 is grasped by the clamp 31 (or, alternatively, 32) which slides slightly on it. The knife 84 then cuts the cord 4, and the clamp 31 or 32 drives the length 40 which has just been individualized.

The pulleys 53 of the folders 5 are arranged in the immediate vicinity of the bottom of the core 2. Their diameter is preferably selected so as to correspond substantially to the radius of curvature of the core in a meridian plane at the height of the bead of the future tire.

The pulleys 52 are arranged at the height of the crown of the core 2, or else even higher and more distant from the core. The pulleys 52 and 53 carry a belt 54 on which there are mounted two tappets 50 and 51 which act in succession, that is to say, one on one length and the following one on the following length. The pulleys 52 and 53 are radially oriented, the pulley 52 being furthermore so positioned with respect to the core that the tappet 50 or 51 can strike the length of cord 40 between the perpendicular to the cord 2 and the edge of the length 40, preferably rather close to the end of the length 40. When the rate of placing is high, the tappet 50 drives the thread radially downward sufficiently fast so that there is a sliding of the cord on the tappet 50, the length 40 being immobilized by adherence in its center on the core 2, which is covered by a layer of rubber. Friction tracks 26 are preferably arranged on both sides of the core in order slightly to support the cord when it is taken over by the tappet 50. By its rapid movement, the tappet 50 therefore drives the cord radially downward and applies it against the core 2, where it adheres everywhere on the layer of rubber without presenting undulations or other irregularities in path. In order to center the length 40 well on the tappet 50, the latter has a small groove, which can be noted from FIG. 1A.

The unit cycle of the machine has just been described. The repetition of this cycle as many times as there are lengths 40 of cord permits the manufacture of the so-called carcass reinforcement. It is still necessary to effect a firm anchoring of all of these cords in order to form the bead of the tire.

A carcass reinforcement constituted in this manner can be anchored on a bead wire, being careful to see to it that each length is sufficiently long to constitute a turn-up around the bead wire. This turn-up is effected by any suitable means, as well known to the person skilled in the art, for instance an inflatable turn-up bladder. Or else a tire bead can be constituted of the type described in U.S. Pat. No. 3,072,171 in FIGS. 4 and 5, by circumferentially winding other cords.

In order to be able to insert and extract the core 2, the shaft of the pulleys 53 pivots around the shaft of the pulleys 52 so as to increase as much as desired the distance between the pulleys 53 while maintaining the belts 54 taut on their respective pulleys 52 and 53.

Figure 5:
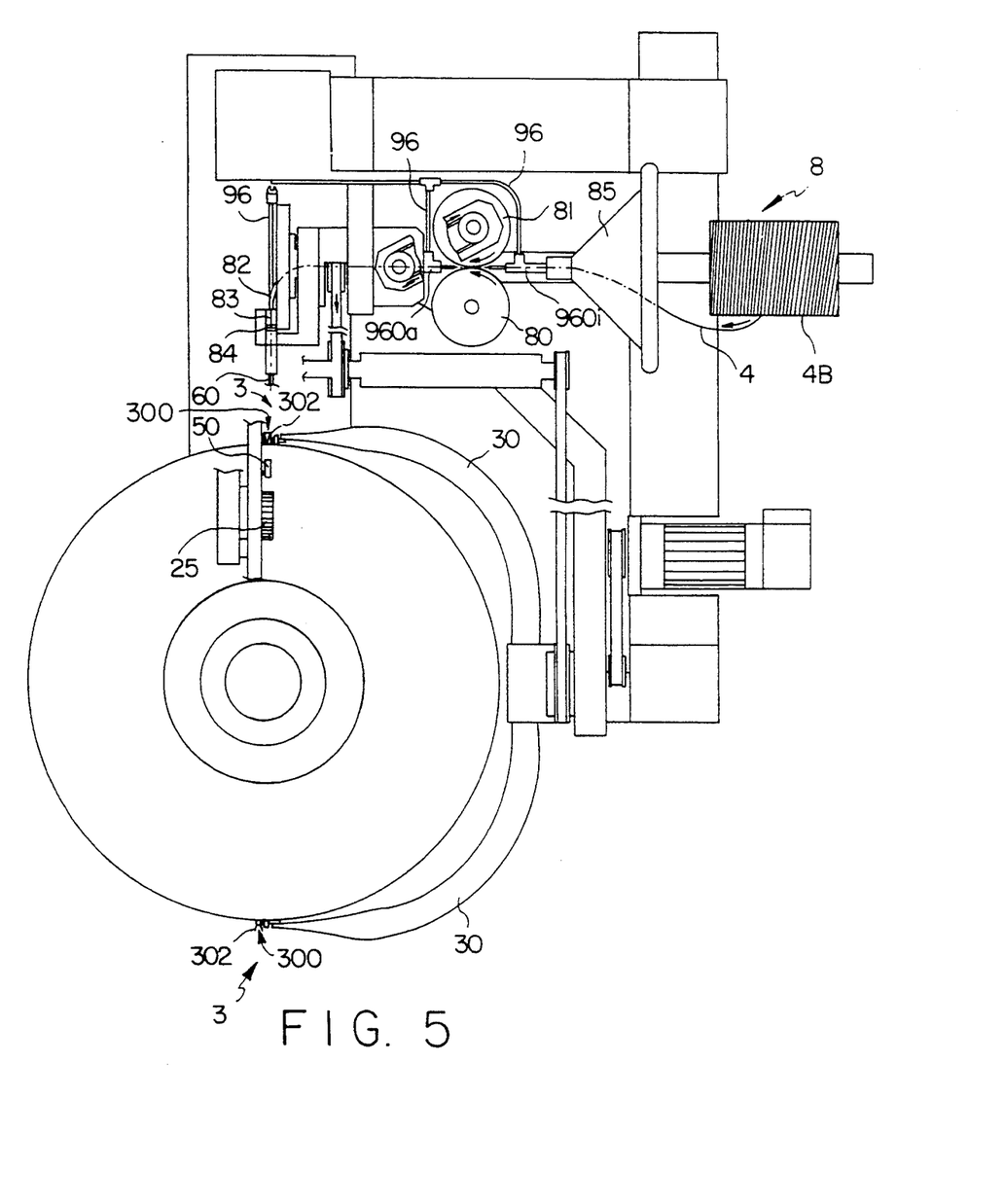
FIG. 5 is a side view of a second embodiment of the apparatus.
Figure 6:
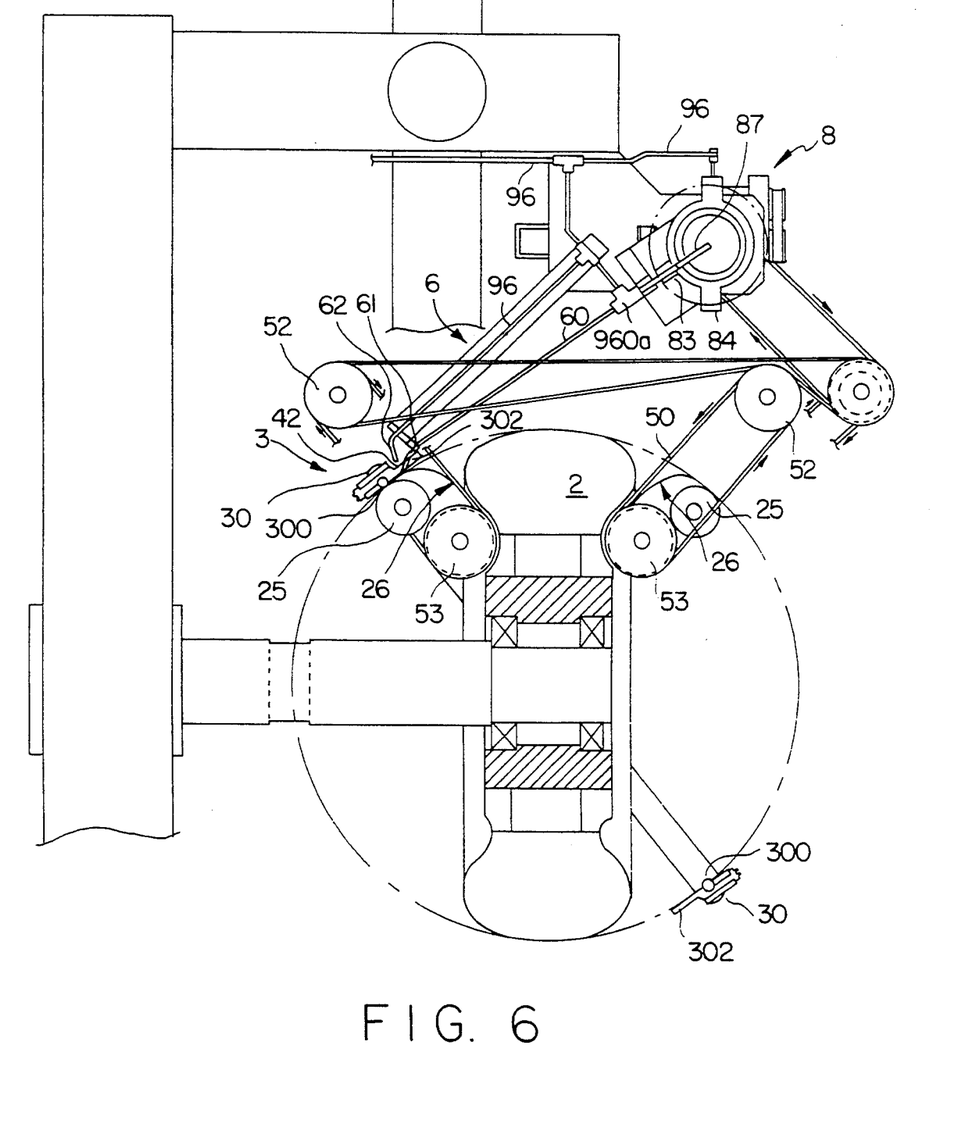
FIG. 6 is an elevation of the second embodiment of the apparatus for the manufacture of a carcass reinforcement.

FIGS. 5 and 6 illustrate a second machine which also permits the manufacture of radial carcass reinforcements, in which the cords are arranged on the core 2 in a meridian plane.

In order to assure the unwinding thereof, the cord 4 is also clamped there between two rollers 80, 81 which are covered by an anti-skid covering. The rollers 80, 81 are both driven at the same speed, which permits the feeding of cord 4 and the precise measurement of the quantity fed, as explained above.

The cord 4 is then introduced into a tube 82 the reinforced end of which constitutes a barrel 83 which supports the cord 4 when it is cut by the rotary knife 84.

It will be noted that, in order to clarify the drawings, FIG. 5 comprises a partial folding. The rotary knife 84, the barrel 83 and the connection piece 60 of the presentation device 6 are shown therein in the plane of the drawing, while their actual position is that shown in FIG. 6.

Each length 40 of cord 4 which has thus been individualized is then subjected to the action of a laying head 3 in rotation in a meridian plane, at a radius just greater than the maximum radius of the core 2. The rotary knife 84 therefore acts downstream of the unwinding rollers 80, 81 and upstream of a presentation device 6, the role of which is to orient the cord 4, more precisely each length 40 of cord 4, in a meridian plane and to present it properly to the laying head 3 so that the latter can lay it both on the core 2 and on intermediate rollers 25 which are arranged on opposite sides of the core 2, centered with respect to the plane containing the path of the laying head 3.

A roller 300, mounted at the end of the arm 30, is the part which applies the cord 4 onto the core 2. The role of the presentation device 6 is therefore to feed the cord 4 centered well with respect to the roller, bring it between the roller 300 and the intermediate roller 25, and also contribute to holding the cord 4 centered with respect to the roller 300 while the latter applies the cord 4 on the core 2.

Of course, the field of action of the laying head 3 must remain free. Therefore, the space necessary for the displacement of the laying head 3 between the presentation device 6 and the intermediate roller 25 is left free.

In order to bring the end of the length 40 of cord 4 in front of the roller 300 both precisely and reliably, a chute 302 is fastened to the arm 30 of the laying head 3. The chute is shaped in such a manner as to obtain a receiving surface having the shape of a V.

This chute 302 can receive the end 42 of the length 40 of cord 4, which makes it possible to tolerate a large margin of inaccuracy for the position thereof. The end 61 of the presentation device 6 (actually a simple connection piece 60 in which the cord 4 is engaged) is so directed that the end 42 of the cord 4 falls rather too far forward with respect to the roller 300 so as to be certain that it never falls on top of this roller 300 or in the upper half thereof. The end of this chute forms a buttonhole through which the cord penetrates.

Contrary to metal wires, textile threads must necessarily be maintained taut by pneumatic propulsion since they do not have any resistance to compression. There can be noted the channel 96 which conducts the compressed air to four places on the path of the cord 4. First of all, upstream of the unwinding rollers 80, 81, reverse pneumatic propulsion 960$i$ tends continuously to pull the thread 4 rearward so that, in case of stoppage or reverse operation of the machine during, for instance, adjustment phases upon starting, the thread 4 always remains taut and does not accumulate between the flared tube 85 for the receiving of the cord 4 and the unwinding rollers 80, 81. Downstream of the latter, there is a first forward propulsion 960$a$ located at the start of the tube 82 conducting the thread 4 towards the barrel 83. It is desirable to create losses in head by means of holes drilled through the tube 82 so as to obtain a good driving force for the thread 4. A second propulsion in forward direction 960$a$ is located at the start of the connection piece 60, which also has holes creating losses in head at about the middle thereof. Finally, a nozzle 62 sends a jet of air just in front of the outlet channel 61 of the presentation device 6.

This outlet channel 61 is located at the end of the connection piece 60 and is slightly curved towards the core 2 so that the end 42 of the cord 4 strikes against the bottom of the chute 302 with an angle of incidence of about 40°. In this way, said end 42 is always properly presented between the intermediate roller 25 and the roller 300.

The roller 300 applies each of the lengths 40 of cord onto each of the intermediate rollers 25 and onto the top of the core 2. The rotation of the intermediate rollers 25 is sufficiently slowed down so that they do not turn upon the application of the cord thereon. Furthermore, the surface of said rollers and the cord 4 have sufficient self-adhesive properties so that the cord adheres to the intermediate rollers 25 when it is placed thereon, but sufficiently slight so that the cord is subsequently easily released, the possible rotation of the intermediate rollers facilitating said release. For example, the intermediate rollers 25 are covered with a layer of vulcanized rubber. The intermediate rollers 25 are spaced apart from each other by an amount which is a function of the length of the lengths 40 to be laid and are so located that they are within the path of the laying head 3, which in the present case is a circle.

Subsequently, the action of the tappets 50 takes place precisely as explained above and the cycle can start again. Here also, a friction path 26 is preferably provided on both sides of the core 2, as shown in FIG. 6.

The third embodiment is specifically designed to lay metal wire in order to form a crown reinforcement. The presentation device 6 of this embodiment is formed by a linear groove arranged perpendicular to a radius included in the median plane, joining the axis of rotation of the core 2 and said linear groove and forming the said desired angle with respect to this median plane, the groove being open towards the core 2. In the case shown, the apparatus is designed specifically to produce crown reinforcements with an angle varying between 15° and 90°.

In FIG. 7, it is seen that the feeding of a metal wire 4 is effected by an assembly of rollers 80, 81 entirely similar to what has been described above. The driving of the rollers 80, 81 permits the continuous measurement of the length of cord 4 fed. Each length 40 of cord is individualized by a rotary knife 84 passing flush with a barrel 83 below which the cord is propelled by the rollers 80, 81. In FIG. 9 it is seen that the presentation device 6 comprises a first channel 67 open towards the core 2 (having walls on the transverse sides and on top), and then a groove 64 forming a linear channel arranged facing the final place of the length 40 on the core 2 and open towards the core. The groove 64 is formed by two cheeks 63 defining it transversely and, on top, by a magnetic ramp with small magnets 66 which, placed on top, can be noted.

A chamber receives the end of the length 40. This chamber comprises essentially an end support 68 above which the length comes to rest and two cheeks 680 defining the further trajectory of the length, as well as the cheeks 63, namely a radial flat trajectory. Between the barrel 83 and the first channel 67, there is the space just necessary for the passage of the knife 84. Between this first channel 67 and the groove 64, there is the space just necessary for the passage of the tappet 70 of one of the folders 7. Between the groove 64 and the chamber containing the end support 68, there is the space necessary for the passage of the tappet 70 of the other folder 7.

The cord 4 of magnetic steel is held at the bottom of the groove 64 by magnetic attraction due to the small magnets 66 placed on top of this ramp, in its turn made of non-magnetic material. These magnets develop a force of attraction on the cord 4 sufficient to grasp it in flight upon emergence from the barrel 83 and sufficiently slight so that the cord 4 can be easily detached when it is struck by the folders 7.

The barrel 67, the groove 64 and the end chamber are oriented with respect to the core 2 in such a manner that their radial projection on the core 2 forms the desired angle for the crown reinforcement cord, namely about 25° in the example considered. The taking of a length 40 of cord 4 is effected as already described by a knife 84 which cuts the cord 4 flush with the barrel 83 when a predetermined length has been introduced into the ramp 64. Each folder 7 is formed by a tappet 70 similar to the tappet 50 of the folder of the preceding variant and describes a circular movement approximately tangent to the core 2.

The discontinuous circles represent, in FIG. 9, the trajectory of the tappets 70 and the dash-line axis circle to the right of FIG. 9 represents the path of the knife 84. The knife 84 is fastened on a disk which forms, in the drawing, a circle of a diameter slightly greater than the diameter of the dashed-line axis circle.

The tappet 70 on the left-hand side of FIG. 9, that is to say the one acting on the front of the length 40 referred to its direction of introduction into the presentation device, preferably acts on the length 40 slightly after the other tappet. Furthermore, in order to improve the projecting of the: length, this same folder (left side of FIG. 9, right side of FIG. 8) is provided with a V-clamp 71 between the branches of which the cord can slide. This clamp forms a V in the plane of FIG. 8 where the reference number 71 points to one of the branches of the V. This V is closed by the action of the immovable cam 72 just after having grasped the cord. The cam acts only on one side of the clamp 71, just sufficiently to hold the cord slightly, but the clamp 71 can slide on the cord during the folding movement since the latter is already held on the core 2 on the other side and at the center of the core by the slightly prior action of the other folder. This arrangement gives assurance that the cord is properly laid straight.

I claim:

1. A method of making a tire on a displaceable annular core having an outer surface which defines the shape of the inner surface of the tire, the tire being progressively built on the outer surface of the core, comprising feeding a length of an individual cord and presenting the individual cord across the outer surface of the core with an intermediate portion of the cord at the desired angular orientation with respect to the outer surface of the core, imparting a cyclic movement to a pair of folders, one on each side of the core, to move them into engagement with the ends of the cord and displace the ends toward the outer surface of the core to apply the individual length of cord at the desired place on the outer surface of the core and then repeat the cycle with another cord.

2. An apparatus for the manufacture of a tire on a displaceable annular core having an outer surface which is the shape of the inner surface of the tire, the tire being progressively built on the outer surface of the core, comprising means for feeding a length of an individual cord and presenting the individual cord across the outer surface of the core with an intermediate portion of the cord at the desired angular orientation with respect to the outer surface of the core, a pair of folders, one on each side of the core, means imparting a cyclic movement to each folder so as to move the folders into engagement with the ends of the cord and displace the ends toward the outer surface of the core to apply the length of the cord at the desired place on the outer surface of the core and then repeat the cycle with another cord.

3. An apparatus according to claim 2, in which the feeding and presenting means includes at least one clamp which is movable with respect to the core, the clamp grasping an end of the cord and displacing it across the outer surface of core and beyond it, the clamp moving in such a manner that the individual cord forms the desired angle with respect to the outer surface of the core.

4. An apparatus according to claim 3, including a clamp-holder belt on which the clamp is mounted, a pair of pulleys for supporting the clamp-holder belt to move the clamp and the individual cord displaced thereby parallel to a plane forming the desired angle at which the cord is to be placed on the outer surface of the core.

5. An apparatus according to claim 3, in which the said angle is 90° with respect to the median plane of the core.

6. An apparatus according to claim 2, in which the folding and presenting means includes a groove extending across the outer surface of the core at the desired angle at which the cord is to be placed on the core, the groove being open towards the core.

7. An apparatus according to claim 6 in which the cord is a length of metal wire and the groove includes a magnetic ramp for holding the wire introduced into the groove by magnetic attraction before it is applied to the core by the folders.

8. An apparatus according to claim 7, in which the said desired angle is between 15° and 90° to the median plane of the core.

9. An apparatus according to claim 2, in which the feeding and presenting means includes a laying head movable in a path for laying a cord on the outer surface of the core, the path of the moving head lying in a plane, two receiving rollers, one on each side of the core, arranged to cooperate with the laying head, means for guiding one end of an individual cord onto one receiving roller and in front of the laying head which grasps the cord and carries it across the outer surface of the core and onto the other receiving roller, each folder acting between the outer surface of the core and the receiving rollers.

10. An apparatus according to claim 2, in which the folder describes a circular movement tangent to the outer surface of the core which corresponds to the shoulder zone of the future tire.

11. An apparatus according to claim 2, in which the folder is mounted on a belt which is engaged on two pulleys, one of which is located at the level of the outer surface of the core which corresponds to the beads of the future tire, while the other is located radially at or above the level of the top of the core.

12. An apparatus according to claim 2, in which the folder comprises a tappet which is directed perpendicular to the direction of its movement.

13. An apparatus according to claim 12, in which one of the folders comprises a clamp which grasps the cord but can slide along it, the folder equipped in this manner acting on the cord after the other folder.

14. An apparatus according to claim 2, in which the feeding and presenting means includes two rollers between which the cord is advanced, at least one of the rollers being driven in rotation at an angular speed to measure the length of cord fed, and including a barrel downstream of the rollers and a knife downstream of the barrel for cutting the individual cord to the desired length.

15. A method of making a tire on an annular core having an outer surface which corresponds to the inner surface of the tire to be made, the outer surface of the core having a circumferential portion and a pair of side portions, comprising cutting a cord to a predetermined length to be applied to the outer surface of the core, feeding the cut length of cord and presenting it across the outer surface of the core with an intermediate portion of the cord oriented at the desired angle with respect to the circumferential portion of the outer surface of the core and the ends of the cord extending beyond the sides of the core, and imparting movement in a plane intersecting the core to a pair of folders, one on each side of the core, to move the folders into engagement with the ends of the cord and displace the ends along opposite side portions of the outer surface of the core to apply the length of the cord at the desired place on the outer surface of the core.

16. A method as set forth in claim 15 in which each individual cord is fed across the circumferential portion of the outer surface of the core in a waiting position for the folders to engage the ends of the cord and apply the cord to the side portions of the outer surface of the core.

17. A method as set forth in claim 15 in which one end of the cord is carried in a circular arc across the outer surface of the core and including holding the ends of the cord in the path of the folders before the folders engage and displace the ends of the cord against the side portions of the outer surface of the core.

18. An apparatus for making a tire on an annular core having an outer surface which corresponds to the inner surface of the tire to be made, the outer surface of the core having a circumferential portion and a pair of side portions, comprising means for cutting a predetermined length of a cord to be applied on the outer surface of the core, means for feeding the cut cord and presenting it across the outer surface of the circumferential portion of the core with an intermediate portion of the cord oriented at the desired angle with respect to the circumferential portion of the outer surface of the core and the ends of the cord extending beyond the sides of the core, a pair of folders, one on each side of the core, and folder carriers for carrying each of the folders in a plane intersecting the core so as to move the folders into engagement with the ends of the cord and displace the ends against the side portions of the outer surface of the core to apply the cord at the desired place on the outer surface of the core.

19. An apparatus as set forth in claim 18 in which the feeding and presenting means moves the cord across the circumferential portion of the outer surface of the core in a waiting position before the folders engage the ends of the cord.

20. An apparatus as set forth in claim 18 in which the feeding and presenting means moves in a circular arc to carry the cord across the circumferential portion of the outer surface of the core, and means for holding the ends of the cord for engagement by the folders.

* * * * *